United States Patent
Menez et al.

(10) Patent No.: US 8,260,676 B2
(45) Date of Patent: Sep. 4, 2012

(54) CONTROL SPENDING BASED ON TIME PERIOD

(75) Inventors: Benoit Pol Menez, Carmel, IN (US); Carolynn Rae Johnson, Indianapolis, IN (US)

(73) Assignee: Thomson Licensing, Boulogne (FR)

( * ) Notice: Subject to any disclaimer, the term of this patent is extended or adjusted under 35 U.S.C. 154(b) by 441 days.

(21) Appl. No.: 12/240,560

(22) Filed: Sep. 29, 2008

(65) Prior Publication Data

US 2009/0089191 A1  Apr. 2, 2009

Related U.S. Application Data

(63) Continuation of application No. 09/745,205, filed on Dec. 21, 2000, now abandoned.

(51) Int. Cl.
G06Q 30/00 (2012.01)
H04N 7/16 (2011.01)

(52) U.S. Cl. .................. 705/26.1; 705/26.25; 725/2

(58) Field of Classification Search ............ None
See application file for complete search history.

(56) References Cited

U.S. PATENT DOCUMENTS

| | | | |
|---|---|---|---|
| 5,559,871 A | 9/1996 | Smith | |
| 5,661,517 A * | 8/1997 | Budow et al. | 725/60 |
| 5,710,901 A | 1/1998 | Stodghill et al. | |
| 5,845,260 A * | 12/1998 | Nakano et al. | 705/17 |
| 5,914,472 A | 6/1999 | Foladare et al. | |
| 5,953,710 A | 9/1999 | Fleming | |
| 6,021,943 A | 2/2000 | Chastain | |
| 6,044,360 A | 3/2000 | Picciallo | |
| 6,067,564 A * | 5/2000 | Urakoshi et al. | 725/2 |
| 6,163,272 A * | 12/2000 | Goode et al. | 725/30 |
| 6,169,790 B1 | 1/2001 | Flon | |
| 6,178,407 B1 * | 1/2001 | Lotvin et al. | 705/14.73 |
| 6,343,279 B1 | 1/2002 | Bissonette et al. | |
| 6,944,585 B1 * | 9/2005 | Pawson | 703/22 |

FOREIGN PATENT DOCUMENTS

| | | |
|---|---|---|
| JP | 8-191357 | 7/1996 |
| JP | 9-130771 A | 5/1997 |
| JP | 10-155042 | 6/1999 |
| JP | 2000-134600 A | 5/2000 |
| JP | 2000-152103 | 5/2000 |
| JP | 2000-152103 A | 5/2000 |

* cited by examiner

*Primary Examiner* — Ryan Zeender
*Assistant Examiner* — Dana Amsdell
(74) *Attorney, Agent, or Firm* — Robert D. Shedd; Vincent E. Duffy; Joel M. Fogelson

(57) ABSTRACT

A system and method for processing user programming request are described. A request entered by a user is detected. An entry for a time period based user spending limit is provided, in respond to the entered user request. The time period based user spending limit entry is received by the system and system tracks the user spending during the time period. In another embodiment, more than one spending limit, corresponding to different time periods, may be entered.

3 Claims, 9 Drawing Sheets

TIME BASED SPENDING LIMITS

801 — [✓] DAILY SPENDING LIMIT    $ [ ][ ][1][0][0]

802 — [ ] WEEKLY SPENDING    $ [ ][ ][ ][ ][ ]

803 — [✓] MONTHLY SPENDING    $ [ ][ ][3][0][0]

804 — [ ] YEARLY SPENDING LIMIT    $ [ ][ ][ ][ ][ ]

[ ] ROLLING PERIOD(S)

FIRST, PUT A CHECK IN THE BOX NEXT TO EACH SPENDING LIMIT YOU WANT TO USE. THEN USE THE NUMBER KEYS TO ENTER THE AMOUNT YOU WANT TO USE AS THE LIMIT.

THE REQUESTED PURCHASE EXCEEDS A TIME-PERIOD SPENDING LIMIT.

TO COMPLETE THIS PURCHASE, PRESS "CONTINUE" AND ENTER THE SYSTEM PASSWORD.

TO EXIT THIS SCREEN, PRESS "CANCEL"

[ CONTINUE ]    [ CANCEL ]

FIG. 9

CONTROL SPENDING BASED ON TIME PERIOD

The present invention generally relates to a system and method for processing user programming request. In particular, the present invention allows a user to specify a spending limit that is based on a selected period, instead of or in addition to per event basis.

BACKGROUND OF THE INVENTION

Current viewers of direct broadcast satellite receivers, such as RCA® DSS® receivers, manufactured and marketed by Thomson Consumer Electronics of Indiana, U.S.A., have the benefit of being able order pay-per-view movies from their receivers. This allows viewers to conveniently view a movie whenever they desire.

To prevent excessive spending by, for example, household members of a subscriber of the above system, the subscriber is provided with a "spending limit" capability as shown, for example, in FIG. 1A or 1B. In FIG. 1A, the spending limit capability can be accessed by selecting one of the user profiles 2-6 of the system, as part of the spending limit submenu selection for the system. In the alternative, the subscriber may access the spending limit option by selecting the user profile editing submenu for a particular user profile and then select the spending limit option 7, as shown in FIG. 1B. In either case, the system currently provides only a "per event" spending limit option.

SUMMARY OF THE INVENTION

The present inventors recognize that it may be desirable to be able to further enhance the system so that a spending limit may be based on a time period basis for each user profile or for the whole system. This would provide the advantage of preventing someone in the household of ordering a large number of events, even though each individual event may be under the per-event spending limit, but nevertheless would aggregate to a large sum of money. In addition, since most households calculate their budget on a per period basis (e.g., monthly), the per period spending limit matches well with a subscriber's budget cycle.

BRIEF DESCRIPTION OF THE DRAWINGS

In the drawing:

FIG. 8 shows an exemplary screen for entering one or more spending limits.

FIG. 9 shows an exemplary warning screen.

DETAILED DESCRIPTION

Figure 1A:
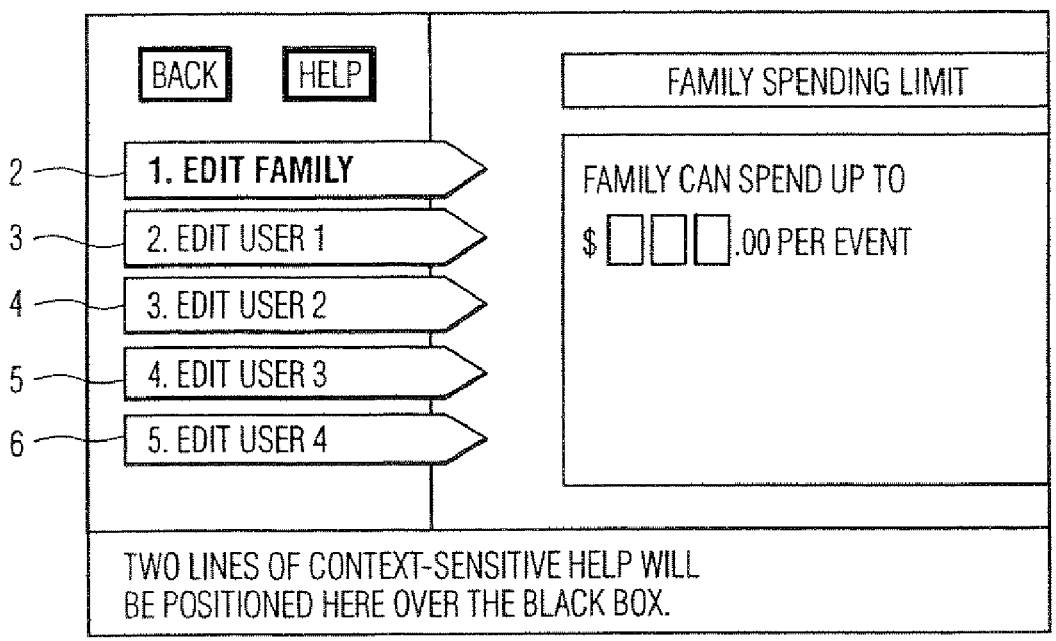
FIGS. 1A and 1B show, respectively, the existing per event spending limit of a current system.
Figure 1B:
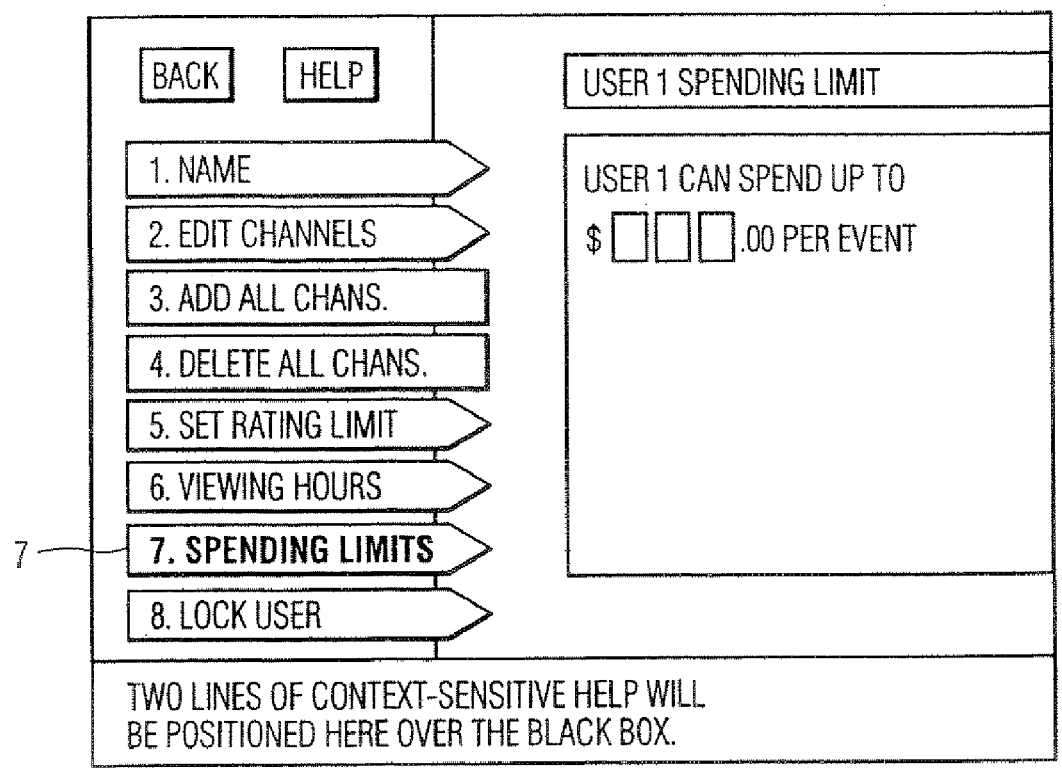
Figure 2:
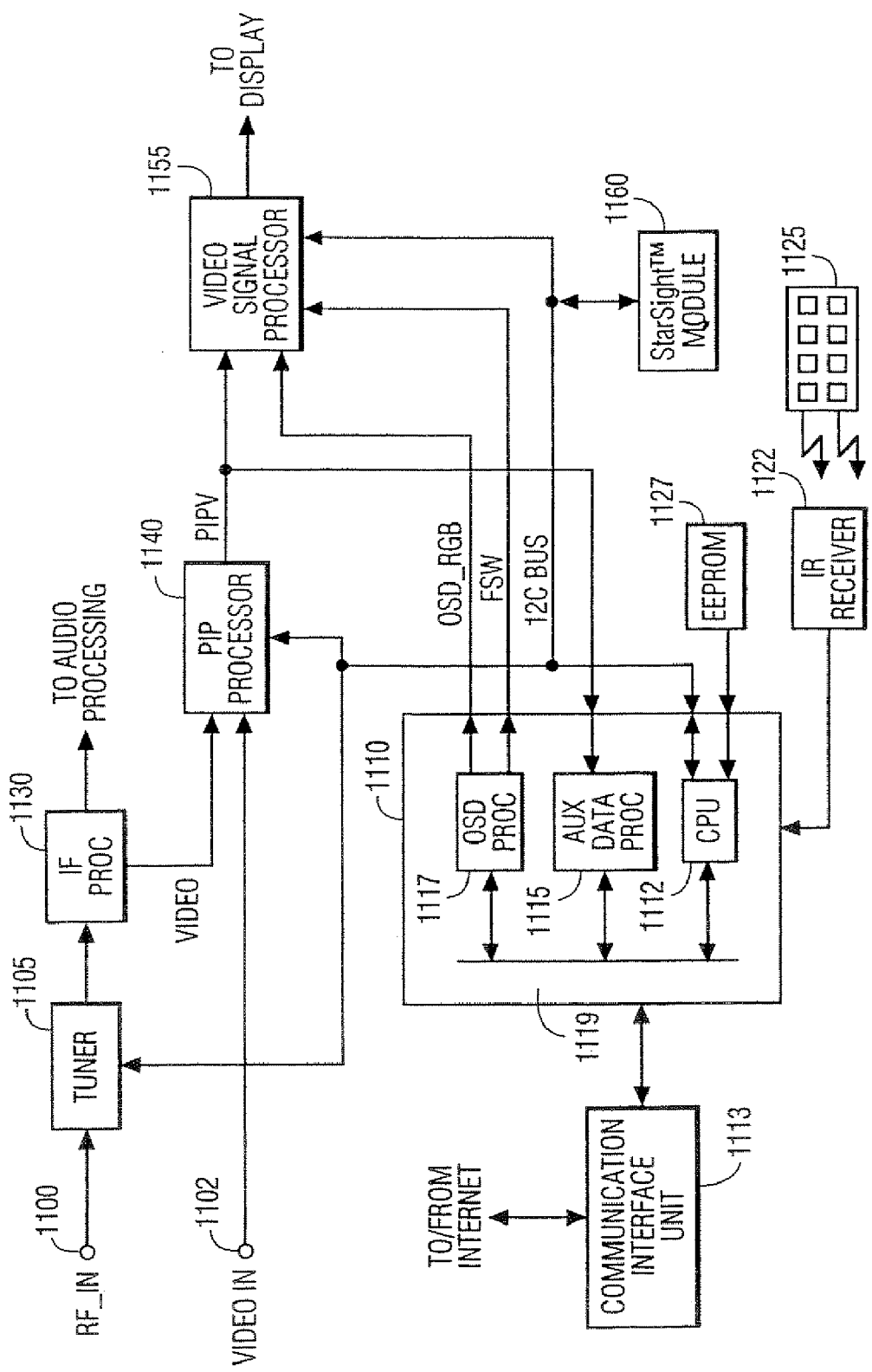
FIG. 2 shows an example of a television system suitable for processing user commands and displaying exemplary user interface screens in accordance to the present invention.

FIG. 2 shows an example of a television system suitable for processing user commands and displaying exemplary user interface screens in accordance with the present invention. The television receiver shown in FIG. 2 is capable of processing both analog NTSC television signals and internet information. The system shown in FIG. 1 has a first input 1100 for receiving television signal RF_IN at RF frequencies and a second input 1102 for receiving baseband television signal VIDEO IN. Signal RF_IN may be supplied from a source such as an antenna or cable system while signal VIDEO IN may be supplied, for example, by a video cassette recorder (VCR). Tuner 1105 and IF processor 1130 operates in a conventional manner for tuning and demodulating a particular television signal that is included in signal RF_IN. IF processor 1130 produces baseband video signal VIDEO representing the video program portion of the tuned television signal. IF processor 1130 also produces a baseband audio signal that is coupled to an audio processing section (not shown in FIG. 1) for further audio processing. Although FIG. 2 shows input 1102 as a baseband signal, the television receiver could include a second tuner and IF processor similar to units 1105 and 1130 for producing a second baseband video signal from either signal RF_IN or from a second RF signal source.

The system shown in FIG. 2 also includes a main microprocessor (mP) 1110 for controlling components of the television receiver such as tuner 1105, picture-in-picture processing unit 1140, video signal processor 1155, and StarSight® data processing module 1160. As used herein, the term "microprocessor" represents various devices including, but not limited to, microprocessors, microcomputers, microcontrollers and controllers. Microprocessor 1110 controls the system by sending and receiving both commands and data via serial data bus I$^2$C BUS which utilizes the well-known I$^2$C serial data bus protocol. More specifically, central processing unit (CPU) 1112 within mP 1110 executes control programs contained within memory, such as EEPROM 1127 shown in FIG. 2, in response to commands provided by a user, e.g., via IR remote control 1125 and IR receiver 1122. For example, activation of a "CHANNEL UP" feature on remote control 1125 causes CPU 1112 to send a "change channel" command along with channel data to tuner 1105 via I$^2$C BUS. As a result, tuner 1105 tunes the next channel in the channel scan list. Another example of a control program stored in EEPROM 1127 is software for implementing the operations shown in FIGS. 6A, 6B, 7 and 8 in flow chart form to be discussed below and in accordance with the present invention.

Main microprocessor 1110 also controls the operation of a communications interface unit 1113 for providing the capability to upload and download information to and from the internet. Communication interface unit 1113 includes, for example, a modem for connecting to an internet service provider, e.g., via a telephone line or via a cable television line. The communication capability allows the system shown in FIG. 1 to provide email capability and internet related features such as web browsing in addition to receiving television programming.

CPU 1112 controls functions included within mP 1110 via bus 1119 within mP 1110. In particular, CPU 1112 controls auxiliary data processor 1115 and on-screen display (OSD) processor 1117. Auxiliary data processor 1115 extracts auxiliary data such as StarSight® data from video signal PIPV. StarSight® data which provides program guide data information in a known format is typically received only on a particular television channel and the television receiver must tune that channel to extract StarSight® data. To prevent StarSight® data extraction from interfering with normal use of the television receiver, CPU 1112 initiates StarSight® data extraction by tuning the particular channel only during a time period when the television receiver is usually not in use (e.g., 2:00 AM). At that time, CPU 1112 configures decoder 1115 such that auxiliary data is extracted from horizontal line intervals such as line 16 that are used for StarSight® data. CPU 1112 controls the transfer of extracted StarSight® data from decoder 1115 via I$^2$C BUS to StarSight® module 1160. A processor internal to the module formats and stores the data in memory within the module. In response to the StarSight® EPG display being activated (e.g., a user activating a particular key on remote control 125), CPU 1112 transfers formatted StarSight® EPG display data from StarSight® module 1160 via I$^2$C BUS to OSD processor 1117.

Figure 5:
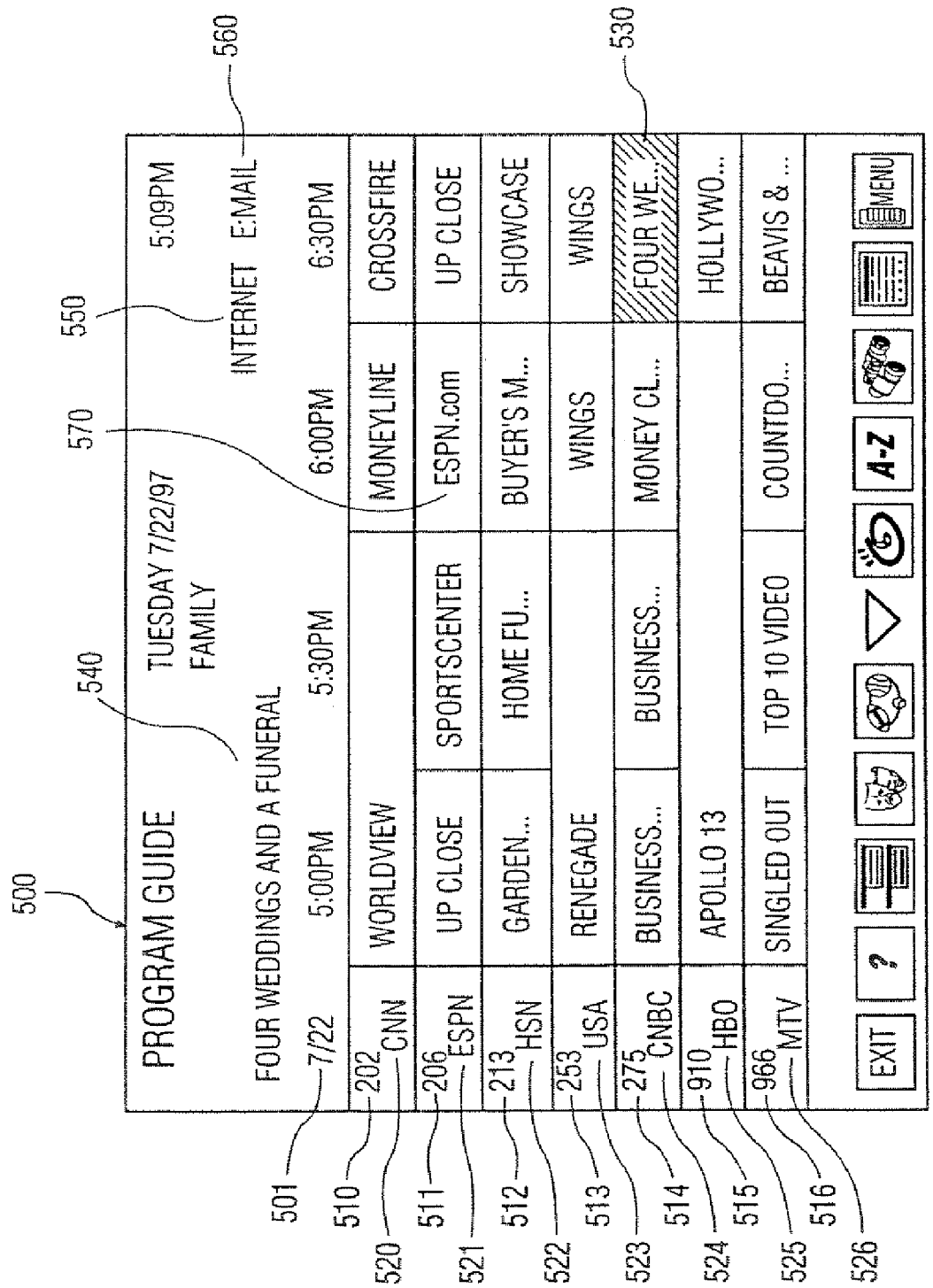
FIG. 5 shows an example of a program guide for selecting programs.

An EPG is an interactive, on-screen display feature that displays information analogous to TV listings found in local newspapers or other print media. In addition, an EPG also includes information necessary for collating and decoding programs. An EPG provides information about each program within the time frames covered by the EPG which typically ranges from the next hour up to seven days. The information contained in an EPG includes programming characteristics such as channel number, program title, start time, end time, elapsed time, time remaining, rating (if available), topic, theme, and a brief description of the program's content. EPGs are usually arranged in a two-dimensional table or grid format with time information on one axis and channel information on the other axis. An example of a program guide is shown in FIG. 5.

Unlike non-interactive guides that reside on a dedicated channel and merely scroll through the current programming on the other channels for the next 2 to 3 hours, EPGs allow viewers to select any channel at any time during some period into the future, e.g., up to seven days forward. Further EPG features include the ability to highlight individual cells of the grid containing program information. Once highlighted, the viewer can perform functions pertaining to that selected program. For instance, the viewer could instantly switch to that program if it is currently being aired. Viewers could also program one touch video cassette recording (VCR) or the like if the television is properly configured and connected to a recording device.

In addition, U.S. Pat. No. 5,515,106, issued to Chaney et al., and assigned to the same assignee of the present invention, describes in detail an exemplary embodiment including data packet structure necessary to implement an exemplary program guide system. The exemplary data packet structure is designed so that both the channel information (e.g., channel name, call letters, channel number, type, etc.) and the program description information (e.g., content, title, rating, star, etc.) relating to a program may be transmitted from a program guide database provider to a receiving apparatus efficiently.

OSD processor 1117 operates in a conventional manner to produce R, G, and B video signals OSD_RGB that, when coupled to a displayed device (not shown), will produce a displayed image representing on-screen display information in according to flow charts to be shown in FIGS. 6-8 and to be described later. OSD processor 1117 also produces control signal Fast-Switch (FSW) which is intended to control a fast switch for inserting signals OSD_RGB into the system's video output signal at times when an on-screen display is to be displayed. Therefore, when a user enables the various user interface screens of the present invention to be described later, OSD processor 1117 produces the corresponding signals OSD_RGB representing the on-screen display information previously stored or programmed in the memory 1127. For example, when a user enables an EPG, e.g., by activating a particular switch on remote control 1125, CPU 1112 enables processor 1117. In response, processor 1117 produces signals OSD_RGB representing the program guide data information previously extracted and already stored in memory, as discussed above. Processor 1117 also produces signal FSW indicating when the EPG is to be displayed.

Video signal processor (VSP) 1155 performs conventional video signal processing functions, such as luma and chroma processing. Output signals produced by VSP 1155 are suitable for coupling to a display device, e.g., a kinescope or LCD device (not shown in FIG. 2), for producing a displayed image. VSP 1155 also includes a fast switch for coupling signals produced by OSD processor 1117 to the output video signal path at times when graphics and/or text is to be included in the displayed image. The fast switch is controlled by control signal FSW which is generated by OSD processor 1117 in main microprocessor 1110 at times when text and/or graphics are to be displayed.

The input signal for VSP 1155 is signal PIPV that is output by picture-in-picture (PIP) processor 1140. When a user activates PIP mode, signal PIPV represents a large picture (large pix) into which a small picture (small pix) is inset. When PIP mode is inactive, signal PIPV represents just the large pix, i.e., no small pix signal is included in signal PIPV. PIP processor 1140 provides the described functionality in a conventional manner using features included in unit 1140 such as a video switch, analog-to-digital converter (ADC), RAM, and digital to analog converter (DAC).

As mentioned above, the display data included in the EPG display is produced by OSD processor 1117 and included in the output signal by VSP 1155 in response to fast switch signal FSW. When controller 1110 detects activation of the EPG display, e.g., when a user presses an appropriate key on remote control 1125, controller 1110 causes OSD processor 1117 to produce the EPG display using information such as program guide data from StarSight® module 1160. Controller 1110 causes VSP 1155 to combine the EPG display data from OSD processor 1117 and the video image signal in response to signal FSW to produce a display including EPG. The EPG can occupy all or only a portion of the display area.

When the EPG display is active, controller 1110 executes an EPG control program stored in EEPROM 1127. The control program monitors the location of a position indicator, such as a cursor and/or highlighting, in the EPG display. A user controls the location of the position indicator using direction and selection keys of remote control 1125. Alternatively, the system could include a mouse device. Controller 1110 detects activation of a selection device, such as clicking a mouse button, and evaluates current cursor location information in conjunction with EPG data being displayed to determine the function desired, e.g., tuning a particular program. Controller 1110 subsequently activates the control action associated with the selected feature.

An exemplary embodiment of the features of the system shown in FIG. 2 that have been described thus far comprises an ST9296 microprocessor produced by SGS-Thomson Microelectronics for providing the features associated with mP 1110; an M65616 picture-in-picture processor produced by Mitsubishi for providing the described basic PIP functionality associated with PIP processor 1140; and an LA7612 video signal processor produced by Sanyo for providing the functions of VSP 1155.

Figure 3:
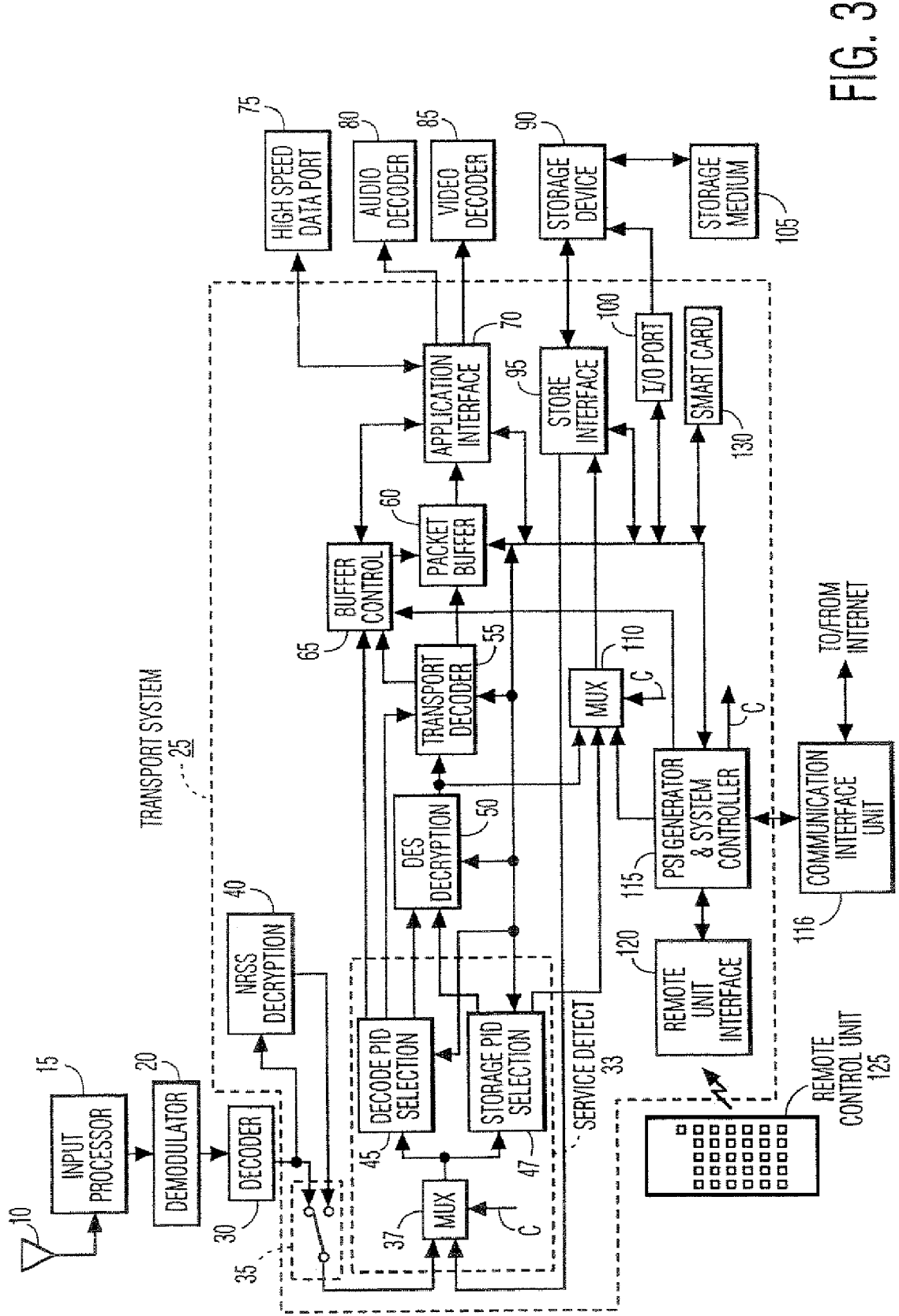
FIG. 3 shows an example of a digital video processing apparatus suitable for processing user commands and displaying exemplary user interface screens in accordance with the present invention.

FIG. 3 shows another example of an electronic device capable of processing user commands and displaying exemplary user interface screens in accordance with the present invention. As described below, the system shown in FIG. 3 is an MPEG compatible system for receiving MPEG encoded transport streams representing broadcast programs. However, the system shown in FIG. 2 is exemplary only. The user interface system described herein is also applicable to other types of digital signal processing devices including non-MPEG compatible systems, involving other types of encoded datastreams. For example, other devices include digital video disc (DVD) systems and MPEG program streams, and systems combining computer and television functions such as the so-called "PCTV". Further, although the system described below is described as processing broadcast programs, this is exemplary only. The term 'program' is used to represent any form of packetized data such as telephone messages, computer programs, internet data or other communications, for example.

In overview, in the video receiver system of FIG. 3, a carrier modulated with video data is received by antenna 10 and processed by unit 15. The resultant digital output signal is demodulated by demodulator 20 and decoded by decoder 30. The output from decoder 30 is processed by transport system 25 which is responsive to commands from remote control unit 125. System 25 provides compressed data outputs for storage, further decoding, or communication to other devices.

Video and audio decoders 85 and 80 respectively, decode the compressed data from system 25 to provide outputs for display. Data port 75 provides an interface for communication of the compressed data from system 25 to other devices such as a computer or High Definition Television (HDTV) receiver, for example. Storage device 90 stores the compressed data from system 25 on storage medium 105. Device 90, in a playback mode also supports retrieval of the compressed data from storage medium 105 for processing by system 25 for decoding, communication to other devices or storage on a different storage medium (not shown to simplify drawing).

Considering FIG. 3 in detail, a carrier modulated with video data received by antenna 10, is converted to digital form and processed by input processor 15. Processor 15 includes radio frequency (RF) tuner and intermediate frequency (IF) mixer and amplification stages for down-converting the input video signal to a lower frequency band suitable for further processing. The resultant digital output signal is demodulated by demodulator 20 and decoded by decoder 30. The output from decoder 30 is further processed by transport system 25.

Multiplexer (mux) 37 of service detector 33 is provided, via selector 35, with either the output from decoder 30, or the decoder 30 output further processed by a descrambling unit 40. Descrambling unit 40 may be, for example, a removable unit such as a smart card in accordance with ISO 7816 and NRSS (National Renewable Security Standards) Committee standards (the NRSS removable conditional access system is defined in EIA Draft Document IS-679, Project PN-3639). Selector 35 detects the presence of an insertable, compatible, descrambling card and provides the output of unit 40 to mux 37 only if the card is currently inserted in the video receiver unit. Otherwise selector 35 provides the output from decoder 30 to mux 37. The presence of the insertable card permits unit 40 to descramble additional premium program channels, for example, and provide additional program services to a viewer. It should be noted that in the preferred embodiment NRSS unit 40 and smart card unit 130 (smart card unit 130 is discussed later) share the same system 25 interface such that only either an NRSS card or a smart card may be inserted at any one time. However, the interfaces may also be separate to allow parallel operation.

The data provided to mux 37 from selector 35 is in the form of an MPEG compliant packetized transport datastream as defined in MPEG systems standard section 2.4 and includes program guide information and the data content of one or more program channels. The individual packets that comprise particular program channels are identified by Packet Identifiers (PIDs). The transport stream contains Program Specific Information (PSI) for use in identifying the PIDs and assembling individual data packets to recover the content of all the program channels that comprise the packetized datastream. Transport system 25, under the control of the system controller 115, acquires and collates program guide information from the input transport stream, storage device 90 or an internet service provider via the communication interface unit 116. The individual packets that comprise either particular program channel content or Program Guide information, are identified by their Packet Identifiers (PIDs) contained within header information. As discussed above, the program description contained in the program guide information may comprise different program descriptive fields such as title, star, rating, etc., relating to a program.

The user interface incorporated in the video receiver shown in FIG. 3 enables a user to activate various features by selecting a desired feature from an on-screen display (OSD) menu. The OSD menu may include an electronic program guide (EPG) as described above, and other features discussed below.

Data representing information displayed in the OSD menu is generated by system controller 115 in response to stored on-screen display (OSD) information representing text/graphics, stored program guide information, and/or program guide and text/graphics information received via the input signal as described above and in accordance with exemplary control programs to be shown in FIGS. 6-8, and to be discussed below. The software control programs may be stored, for example, in embedded memory (not shown) of system controller 115.

Using remote control unit 125 (or other selection means such as a mouse) a user can select from the OSD menu items such as a program to be viewed, a program to be stored (e.g., recorded), the type of storage media and manner of storage. System controller 115 uses the selection information, provided via interface 120, to configure system 25 to select the programs for storage and display and to generate PSI suitable for the selected storage device and media. Controller 115 configures system 25 elements 45, 47, 50, 55, 65 and 95 by setting control register values within these elements via a data bus and by selecting signal paths via muxes 37 and 110 with control signal C.

In response to control signal C, mux 37 selects either, the transport stream from unit 35, or in a playback mode, a datastream retrieved from storage device 90 via store interface 95. In normal, non-playback operation, the data packets comprising the program that the user selected to view are identified by their PIDs by selection unit 45. If an encryption indicator in the header data of the selected program packets indicates the packets are encrypted, unit 45 provides the packets to decryption unit 50. Otherwise unit 45 provides non-encrypted packets to transport decoder 55. Similarly, the data packets comprising the programs that the user selected for storage are identified by their PIDs by selection unit 47. Unit 47 provides encrypted packets to decryption unit 50 or non-encrypted packets to mux 110 based on the packet header encryption indicator information.

The functions of decryptors 40 and 50 may be implemented in a single removable smart card which is compatible with the NRSS standard. The approach places all security related functions in a removable unit that can easily be replaced if a service provider decides to change encryption techniques or to permit easily changing the security system, e.g., to descramble a different service.

Units 45 and 47 employ PID detection filters that match the PIDs of incoming packets provided by mux 37 with PID values pre-loaded in control registers within units 45 and 47 by controller 115. The pre-loaded PIDs are used in units 47 and 45 to identify the data packets that are to be stored and the data packets that are to be decoded for use in providing a video image. The pre-loaded PIDs are stored in look-up tables in units 45 and 47. The PID look-up tables are memory mapped to encryption key tables in units 45 and 47 that associate encryption keys with each pre-loaded PID. The memory mapped PID and encryption key look-up tables permit units 45 and 47 to match encrypted packets containing a pre-loaded PID with associated encryption keys that permit their decryption. Non-encrypted packets do not have associated encryption keys. Units 45 and 47 provide both identified packets and their associated encryption keys to decryptor 50. The PID look-up table in unit 45 is also memory mapped to a destination table that matches packets containing pre-loaded PIDs with corresponding destination buffer locations in packet buffer 60. The encryption keys and destination buffer location addresses associated with the programs selected by a user for viewing or storage are pre-loaded into units 45 and 47 along with the assigned PIDs by controller 115. The encryption keys are generated by ISO 7816-3 compliant smart card system 130 from encryption codes extracted from the input datastream. The generation of the encryption keys is subject to customer entitlement determined from coded information in the input data stream and/or pre-stored on the insertable smart card itself (International Standards Organization document ISO 7816-3 of 1989 defines the interface and signal structures for a smart card system).

The packets provided by units 45 and 47 to unit 50 are encrypted using an encryption technique such as the Data Encryption Standard (DES) defined in Federal Information Standards (FIPS) Publications 46, 74 and 81 provided by the National Technical Information Service, Department of Commerce. Unit 50 decrypts the encrypted packets using corresponding encryption keys provided by units 45 and 47 by applying decryption techniques appropriate for the selected encryption algorithm. The decrypted packets from unit 50 and the non-encrypted packets from unit 45 that comprise the program for display are provided to decoder 55. The decrypted packets from unit 50 and the non-encrypted packets from unit 47 that comprise the program for storage are provided to mux 110.

Unit 60 contains four packet buffers accessible by controller 115. One of the buffers is assigned to hold data destined for use by controller 115 and the other three buffers are assigned to hold packets that are destined for use by application devices 75, 80 and 85. Access to the packets stored in the four buffers within unit 60 by both controller 115 and by application interface 70 is controlled by buffer control unit 65. Unit 45 provides a destination flag to unit 65 for each packet identified by unit 45 for decoding. The flags indicate the individual unit 60 destination locations for the identified packets and are stored by control unit 65 in an internal memory table. Control unit 65 determines a series of read and write pointers associated with packets stored in buffer 60 based on the First-In-First-Out (FIFO) principle. The write pointers in conjunction with the destination flags permit sequential storage of an identified packet from units 45 or 50 in the next empty location within the appropriate destination buffer in unit 60. The read pointers permit sequential reading of packets from the appropriate unit 60 destination buffers by controller 115 and application interface 70.

The non-encrypted and decrypted packets provided by units 45 and 50 to decoder 55 contain a transport header as defined by section 2.4.3.2 of the MPEG systems standard. Decoder 55 determines from the transport header whether the non-encrypted and decrypted packets contain an adaptation field (per the MPEG systems standard). The adaptation field contains timing information including, for example, Program Clock References (PCRs) that permit synchronization and decoding of content packets. Upon detection of a timing information packet, that is a packet containing an adaptation field, decoder 55 signals controller 115, via an interrupt mechanism by setting a system interrupt, that the packet has been received. In addition, decoder 55 changes the timing packet destination flag in unit 65 and provides the packet to unit 60. By changing the unit 65 destination flag, unit 65 diverts the timing information packet provided by decoder 55 to the unit 60 buffer location assigned to hold data for use by controller 115, instead of an application buffer location.

Upon receiving the system interrupt set by decoder 55, controller 115 reads the timing information and PCR value and stores it in internal memory. PCR values of successive timing information packets are used by controller 115 to adjust the system 25 master clock (27 MHz). The difference between PCR based and master clock based estimates of the time interval between the receipt of successive timing packets, generated by controller 115, is used to adjust the system 25 master clock. Controller 115 achieves this by applying the derived time estimate difference to adjust the input control voltage of a voltage controlled oscillator used to generate the master clock. Controller 115 resets the system interrupt after storing the timing information in internal memory.

Packets received by decoder 55 from units 45 and 50 that contain program content including audio, video, caption, and other information, are directed by unit 65 from decoder 55 to the designated application device buffers in packet buffer 60. Application control unit 70 sequentially retrieves the audio, video, caption and other data from the designated buffers in buffer 60 and provides the data to corresponding application devices 75, 80 and 85. The application devices comprise audio and video decoders 80 and 85 and high speed data port 75. For example, packet data corresponding to a composite program guide generated by the controller 115 as described above and as shown in FIG. 5, may be transported to the video decoder 85 for formatting into video signal suitable for display on a monitor (not shown) connected to the video decoder 85. Also, for example, data port 75 may be used to provide high speed data such as computer programs, for example, to a computer. Alternatively, port 75 may be used to output data to a HDTV decoder to display images corresponding to a selected program or a program guide, for example.

Packets that contain PSI information are recognized by unit 45 as destined for the controller 115 buffer in unit 60. The PSI packets are directed to this buffer by unit 65 via units 45, 50 and 55 in a similar manner to that described for packets containing program content. Controller 115 reads the PSI from unit 60 and stores it in internal memory.

Controller 115 also generates condensed PSI (CPSI) from the stored PSI and incorporates the CPSI in a packetized datastream suitable for storage on a selectable storage medium. The packet identification and direction is governed by controller 115 in conjunction with the unit 45 and unit 47 PID, destination and encryption key look-up tables and control unit 65 functions in the manner previously described.

In addition, controller 115 is coupled to a communication interface unit 116 that operates in a manner similar to interface unit 1113 in FIG. 2. That is, unit 116 provides the capability to upload and download information to and from the internet. Communication interface unit 116 includes, for example, a modem for connecting to an internet service provider, e.g., via a telephone line or via a cable television line. The communication capability allows the system shown in FIG. 3 to provide email capability and internet related features such as web browsing in addition to receiving television programming.

Figure 4:
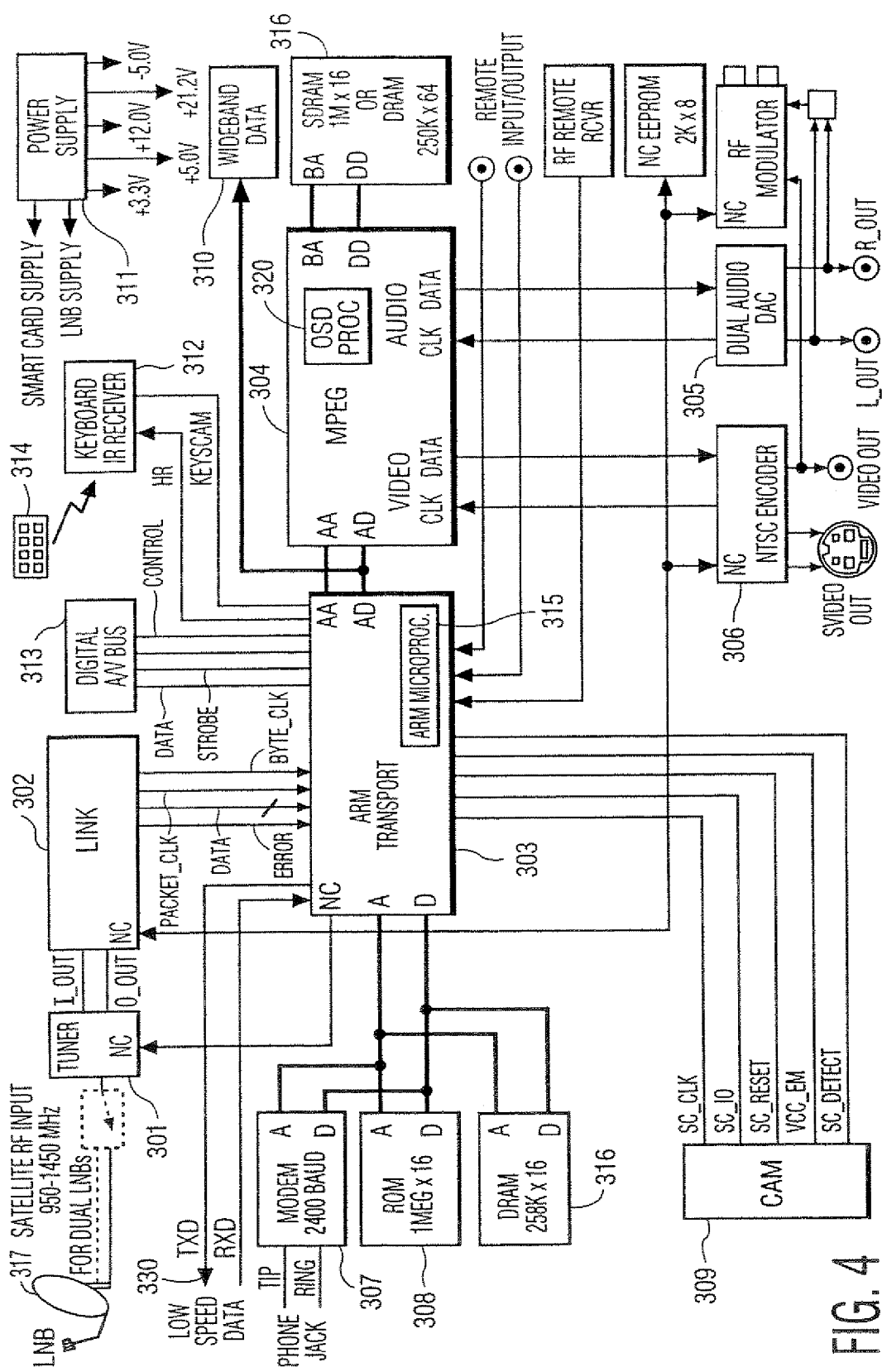
FIG. 4 shows a block diagram of a specific implementation of a digital satellite system suitable for processing user commands and displaying exemplary user interface screens in accordance with the present invention.

FIG. 4 is a specific implementation of an electronic device generally shown in FIG. 3 and described in detail above. FIG. 4 represents a satellite receiver set-top box, designed and manufactured by Thomson Consumer Electronics, of Indianapolis, Ind., USA, for receiving DirecTV™ satellite service provided by Hughes Electronics.

As shown in FIG. 4, the set-top box has a tuner 301 which receives and tunes applicable satellite RF signals in the range of 950-1450 Mhz from a satellite antenna 317. The tuned analog signals are outputted to a link module 302 for further processing. Link module 302 is responsible for further processing of the analog tuned signals I_out and Q_out from tuner 301, including filtering and conditioning of the analog signals, and conversion of the analog signals into a digital output signal, DATA. The link module 302 is implemented as an integrated circuit (IC). The link module IC is manufactured by SGS-Thomson Microelectronics of Grenoble, France, and has Part No. ST 15339-610.

The digital output, DATA, from the link module 302 consists of compliant packetized data stream recognized and processable by the transport unit 303. The datastream, as discussed in detail in relation to FIG. 3, incldes program guide data information and the data content of one or more program channels of the satellite broadcast service from Direct TV™. As discussed above, program guide data contains information relating to the type of program (e.g., audio-only, video-only, etc.) as indicated, for example, by the "class" type.

The function of the transport unit 303 is the same as the transport system 25 shown in FIG. 3 and discussed already. As described above, the transport unit 303, processes the packetized data stream according to the Packet Identifiers (PID) contained in the header information. The processed data stream is then formatted into MPEG compatible, compressed audio and video packets and coupled to a MPEG decoder 304 for further processing.

The transport unit 303 is controlled by an Advanced RISC Microprocessor (ARM) 315 which is a RISC based microprocessor. The ARM processor 315 executes control software residing in ROM 308. Exemplary components of the software may be, for example, control programs shown in FIGS. 6-8 for processing user interface commands and displaying OSD information in accordance with aspects of the present invention as will be discussed below.

The transport unit 303 is typically implemented as an integrated circuit. For example, a preferred embodiment is an IC manufactured by SGS-Thomson Microelectronics and has a Part No. ST 15273-810 or 15103-65C.

The MPEG compatible, compressed audio and video packets from the transport unit 303 are delivered to a MPEG decoder 304. The MPEG decoder decodes the compressed MPEG datastream from the transport unit 303. The decoder 304 then outputs the applicable audio stream which can be further processed by the audio digital-to-analog converter (DAC) 305 to convert the digital audio data into analog sound. The decoder 304 also outputs applicable digital video data which represents image pixel information to a NTSC encoder 306. The NTSC encoder 306 then further processes this video data into NTSC compatible analog video signal so that video images may be displayed on a regular NTSC television screen. The MPEG decoder as described above may be implemented as an integrated circuit. One exemplary embodiment may be an MPEG decoder IC manufactured by SGS-Thomson Microelectronics having Part No. ST 13520.

Included in the MPEG processor 304 is an OSD processor 320. The OSD processor 320 reads data from SDRAM 316 which contains stored OSD information. OSD information corresponds to bitmap OSD graphics/text images. The OSD processor is capable of varying the color and/or translucency of each pixel of an OSD image under the control of the ARM microprocessor 315 in a conventional manner.

The OSD processor is also responsible for generating an exemplary program guide as shown in FIG. 5 under the control of the ARM processor 315. In the exemplary embodiment, upon detecting a user request to generate a guide display, the ARM microprocessor 315 processes the program guide data information obtained from a data stream provided by a program guide information provider and formats the guide data information into OSD pixel data corresponding to a "grid guide" as shown in FIG. 5. The OSD pixel data from the transport unit 303 is then forwarded to OSD processor 320 in the MPEG audio/video decoder 304 for generating the guide image, as described before.

As shown in FIG. 5, the "grid guide" 500 typically occupies the whole screen of a display. The grid guide 500 shows a program schedule in a time-and-channel format, similar to a TV schedule listed in a newspaper. In particular, one dimension (e.g., horizontal) of the guide shows the time information while the other dimension (e.g., vertical) of the guide shows the channel information. The time information is conveyed to the user by having a time line 501 on the top portion of the guide and is demarked by half hour intervals. The channel information is conveyed to the user by channel numbers 510-516 and corresponding channel station names 520-526.

In addition, the program guide 500 contains icons Internet 550 and Email 560. By clicking on these icons, a user can surf the internet and send/receive email respectively through the communication interface unit 307. In addition, an internet web site icon may also be incorporated into a grid of a program guide. For example, by clicking on "ESPN.com" within grid 570, the user will automatically be linked to, for example, an ESPN web site.

A low speed data port 330 is used to connect to an IR-Blaster (not shown) for controlling a VCR for recording a program. As discussed before, an IR blaster is basically a programmable VCR remote control emulator controlled by the satellite receiver shown in FIG. 4. It is positioned in front of a VCR remote sensor of an attached VCR and will transmit commands such as "ON" and "RECORD" under the control of the satellite receiver at the appropriate time, according to the timer screen information entered by the users.

Additional relevant functional blocks of FIG. 4 include modem 307 which corresponds to the communication interface unit 116 shown in FIG. 3 for access to the internet, for example. Conditional Access Module (CAM) 309, corresponds to the NRSS decryption unit 130 shown in FIG. 3 for providing conditional access information. Wideband data module 310 corresponds to High Speed Data Port 75 shown in FIG. 3 for providing high speed data access to, for example, a HDTV decoder or a computer. A keyboard/IR Receiver module 312 corresponds to Remote Unit interface 120 shown in FIG. 3 for receiving user control commands from a user control unit 314. Digital AV bus module 313 corresponds to I/O port 100 shown in FIG. 3 for connection to an external device such as a VCR or a DVD player.

Figure 6:
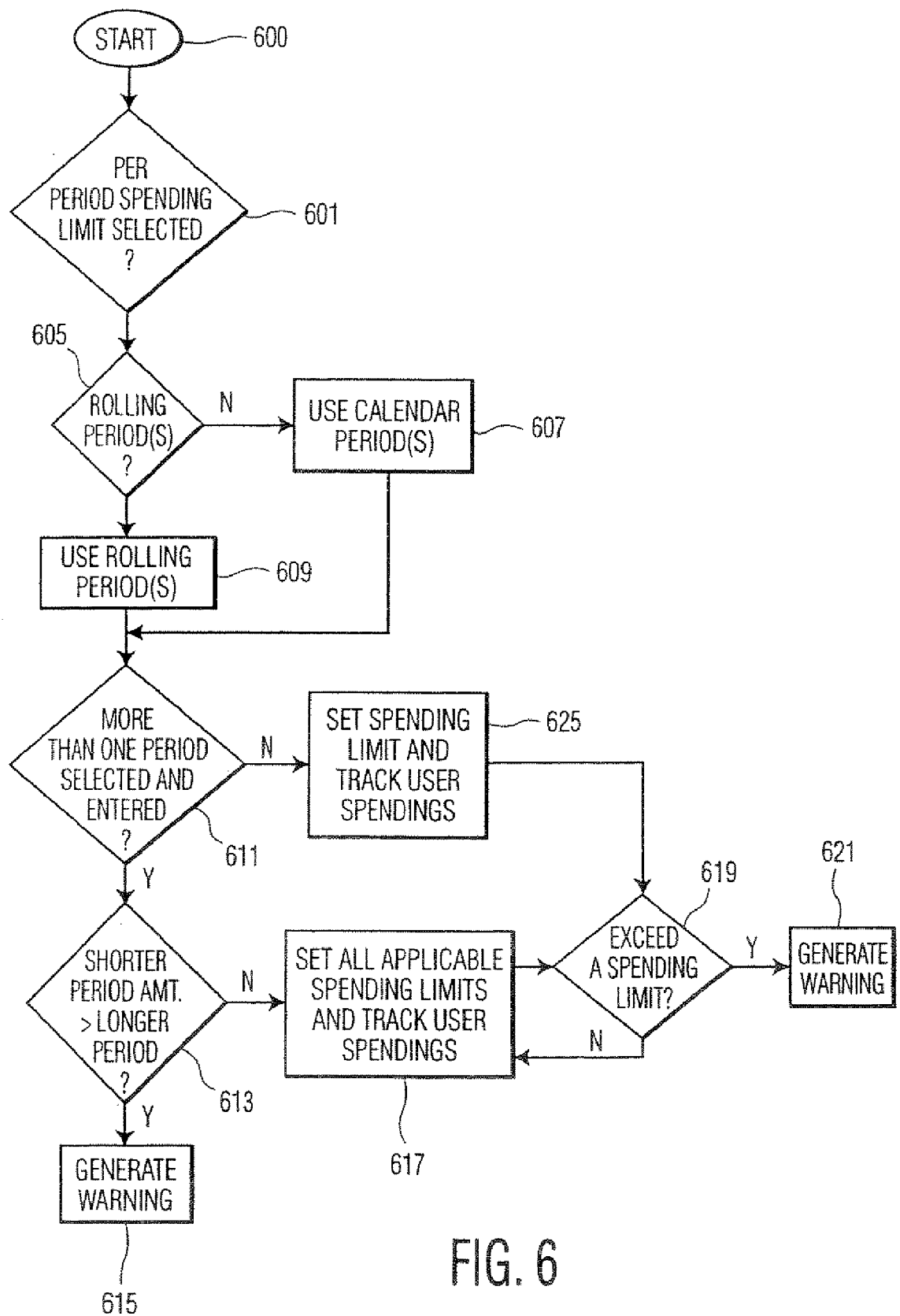
FIG. 6 shows a flowchart, in accordance with the present invention, for processing user commands and displaying exemplary user interface screens in accordance with the present invention.

FIGS. 6 show an exemplary control program in flow chart form, which may be executed by either the CPU 1112 of FIG. 2, Controller 115 of FIG. 3, or ARM microprocessor 315 of FIG. 4 to implement the features according to the present invention. A person skilled in the art would readily recognize that these control programs when executed by any one of the systems described in FIGS. 2-4 will provide the same features in accordance with the present invention. Therefore, to avoid redundancy, the exemplary control program shown in FIG. 6 will be described below only with respect to the exemplary hardware implementation shown in FIG. 4.

Figure 7A:
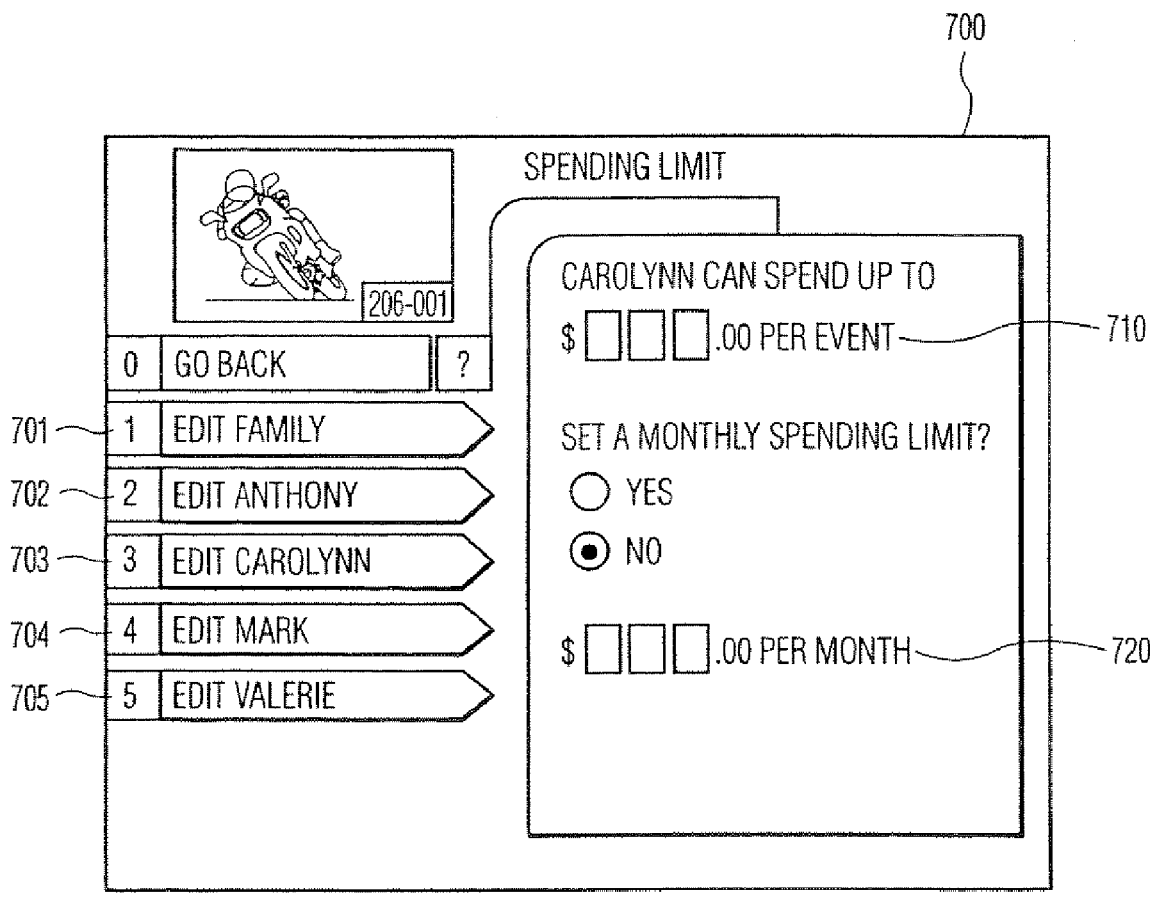
FIGS. 7A and 7B show an exemplary screen for implementing features according to the present invention.

As shown in step 601 of FIG. 6, a user may select the option of specifying a per period spending limit. As discussed above, in the system shown in FIG. 4, a user may make a such a menu selection using a remote control unit 314. In one exemplary embodiment, the system may display a screen 700 as shown in FIG. 7A, under the control of the ARM microprocessor 315. This screen may be accessed when a user selects the spending limit submenu. The user can then select one of the user profiles 701-705 to set the applicable spending limits for the selected user profile.

Figure 7B:
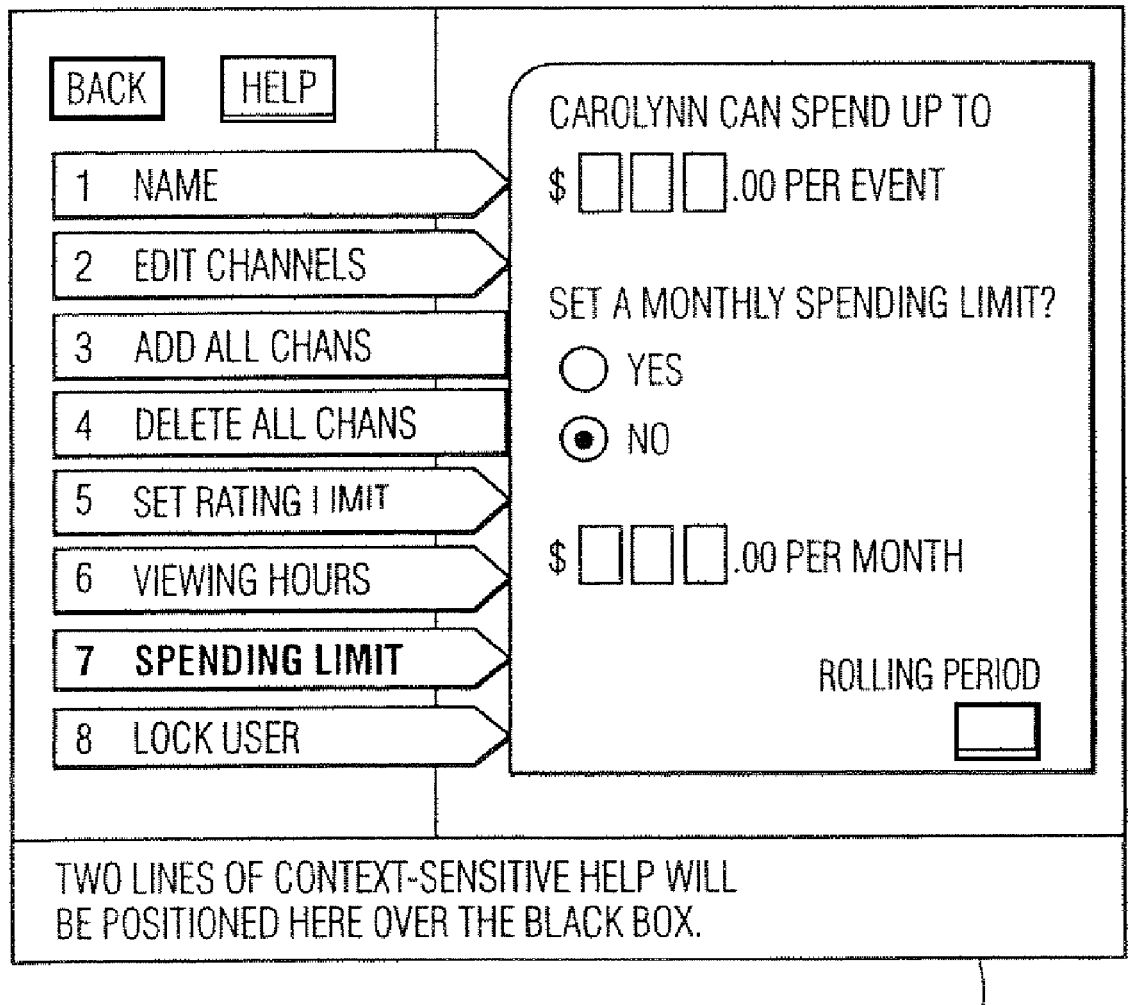

In this example, the user is provided with the choice of entering a per event spending 710 and/or a time period based spending limit 720. In this example, the user may enter a period based spending limit for a period of a month. Similarly, another exemplary spending limit screen is shown in FIG. 7B. This display screen is similar to FIG. 7A, but the user may access this screen by selecting the submenu for editing features for a particular user profile in the system.

Additionally, the user may select the option of having a rolling period (instead of a calendar period), as shown in step 605 of FIG. 6 and shown as option 750 on FIG. 7B. If the user selects the rolling period, the system will calculate the rolling period from the date the time-period option is selected and entered. For example, if the user selects and enters a rolling monthly period on Dec. 5, 2000, the system will set the monthly spending period to expires 30 days (or in the alternative 31 days) from Dec. 5, as shown in step 607. On the other hand, if a rolling period is not selected, the system will calculate the monthly period, based on the calendar (e.g., during the month of December), as shown in step 609.

In another exemplary embodiment, the system may allow a user to set spending limits for multiple time periods, as shown in step 611 of FIG. 6. An exemplary screen 800 for specifying this option is shown in FIG. 8. A user simply selects any one or ones of the time periods (801-804) and then enters the desired spending limit amount for each checked time limit(s).

In one exemplary aspect of the invention, if more than one time periods are selected and entered by a user as shown, for example, in FIG. 8, the system will perform an error check for the various spending limits entered by the user. That is, the system will make sure that a shorter time period spending limit is not greater than a longer time period spending limit entered by the user, as shown in step 613. The system will generate an appropriate warning to the user if the system detects such an error as shown in step 615.

The system will then proceed to set all the applicable time period spending limits selected and entered by the user and continually track user spending amount for each user profile, as shown in step 617. At step 621, if during any selected and entered time period, a spending limit is exceeded, the system will generate an exemplary warning screen 900 as shown in FIG. 9. This screen allows a user the ability to either cancel a pay per view program selection or override the previously entered spending limit by entering a password.

It is to be understood that the embodiments and variations shown and described herein are for illustrations only and that various modifications may be implemented by those skilled in the art without departing from the scope of the invention.

The invention claimed is:

1. A method for setting spending limits for purchasing programming received by a receiver, said method comprising the steps of:
   setting, via said receiver, a first spending limit for a first user for a first period of time;
   setting, via said receiver, a second spending limit for a second user for a second period of time, wherein said first and second periods of time are different;
   displaying, via said receiver, a warning message when at least one of said first spending limit and second spending limit will be exceeded when an associated user attempts to purchase programming for said receiver, wherein:
   said first period of time is associated with one of a calendar month period and a rolling period;
   said second period of time includes a per event spending limit; and
   said receiver enables selections for said calendar month period, said rolling period and said per event spending limit via a single on-screen menu.

2. The method of claim 1, wherein a third time period of time representing a weekly spending limit is also used for said first user and said warning message is displayed when at least one of: said first spending limit, said second spending limit, and said third spending limit will be exceeded when an associated user attempts to purchase programming for said receiver.

3. The method of claim 1, wherein said rolling period extends from a day of a month in which said rolling period is selected to a same day of a next month.

* * * * *